US010808650B2

(12) United States Patent
Basmaji et al.

(10) Patent No.: US 10,808,650 B2
(45) Date of Patent: Oct. 20, 2020

(54) SYSTEM AND METHOD FOR VALVE SEAT INJECTION

(71) Applicant: Ford Global Technologies, LLC, Dearborn, MI (US)

(72) Inventors: Joseph F. Basmaji, Waterford, MI (US); Mark Madin, Canton, MI (US); William Charles Ruona, Farmington Hills, MI (US); John Cornell, Allenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/184,932

(22) Filed: Nov. 8, 2018

(65) Prior Publication Data

US 2020/0149497 A1 May 14, 2020

(51) Int. Cl.
*F02M 25/00* (2006.01)
*F01L 3/22* (2006.01)
*F02F 1/40* (2006.01)

(52) U.S. Cl.
CPC ............... *F02M 25/00* (2013.01); *F01L 3/22* (2013.01); *F01L 2810/01* (2013.01); *F02F 1/40* (2013.01)

(58) Field of Classification Search
CPC ........ F02M 25/00; F01L 3/22; F01L 2810/01; F01P 3/14; F02F 1/36; F02F 1/40; Y02T 10/121
USPC ...................................................... 123/188.8
See application file for complete search history.

(56) References Cited

U.S. PATENT DOCUMENTS

| | | | | |
|---|---|---|---|---|
| 1,799,397 A | * | 4/1931 | Taylor | F02M 1/00 |
| | | | | 123/431 |
| 1,873,119 A | * | 8/1932 | Griswold | F01L 3/16 |
| | | | | 123/41.17 |
| 2,440,572 A | * | 4/1948 | Brandenburg | F01L 3/22 |
| | | | | 123/575 |
| 2,593,769 A | * | 4/1952 | Kollsman | F02M 69/00 |
| | | | | 123/255 |
| 4,050,422 A | * | 9/1977 | Noguchi | F02B 19/1066 |
| | | | | 123/260 |
| 5,148,788 A | | 9/1992 | Saikalis et al. | |
| 5,957,106 A | | 9/1999 | Maloney et al. | |
| 6,260,546 B1 | | 7/2001 | Vaughn | |
| 7,077,100 B2 | | 7/2006 | Vogel et al. | |

(Continued)

FOREIGN PATENT DOCUMENTS

| | | | | |
|---|---|---|---|---|
| DE | 3226439 A1 | * | 1/1984 | ............... F01L 3/22 |
| FR | 2893081 A3 | * | 5/2007 | ............... F01L 3/12 |
| WO | WO-2014128342 A1 | * | 8/2014 | ............... F01L 3/06 |

OTHER PUBLICATIONS

DE-3226439 English langauge machine translation.*
FR-2893081 English langauge machine translation.*

*Primary Examiner* — Patrick Hamo
*Assistant Examiner* — Wesley G Harris
(74) *Attorney, Agent, or Firm* — Geoffrey Brumbaugh; McCoy Russell LLP

(57) ABSTRACT

Methods and systems are provided for implementing fluid injection through a cylinder valve seat. The engine system may include a cylinder valve with a valve head mating with a valve seat when the valve is closed. The valve seat includes an injection orifice blocked by the valve head when the cylinder valve is closed and unblocked when the cylinder valve is opened.

20 Claims, 9 Drawing Sheets

(56) References Cited

U.S. PATENT DOCUMENTS 9,777,646 B2 10/2017 Bidner et al.
2014/0331969 A1* 11/2014 Bidner .................. F02M 25/00
123/434

* cited by examiner

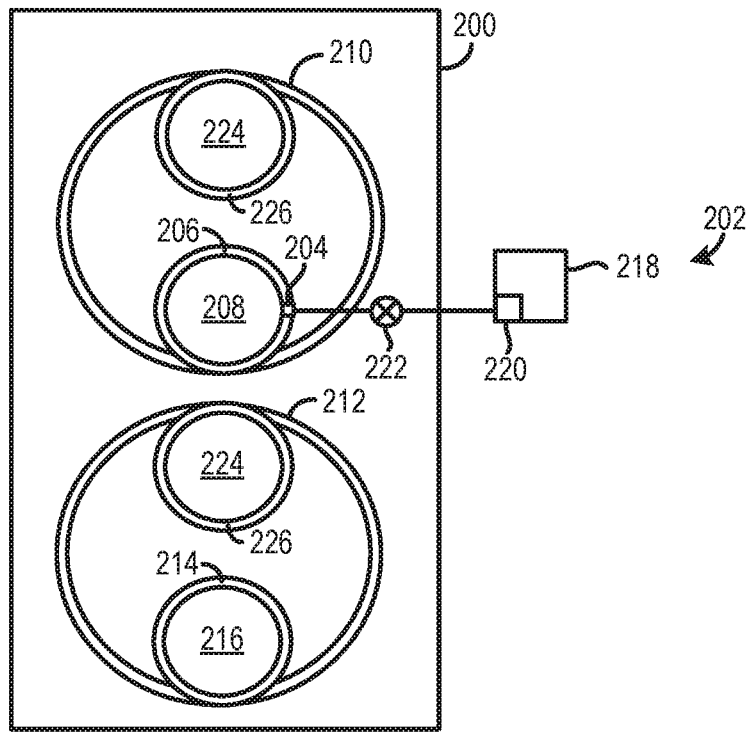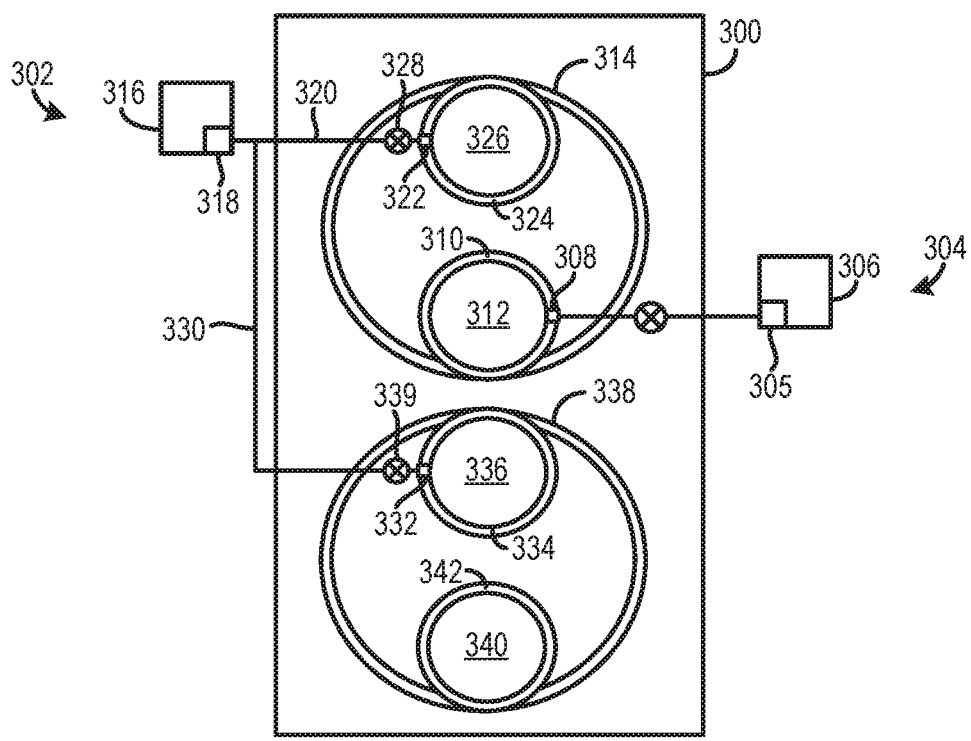

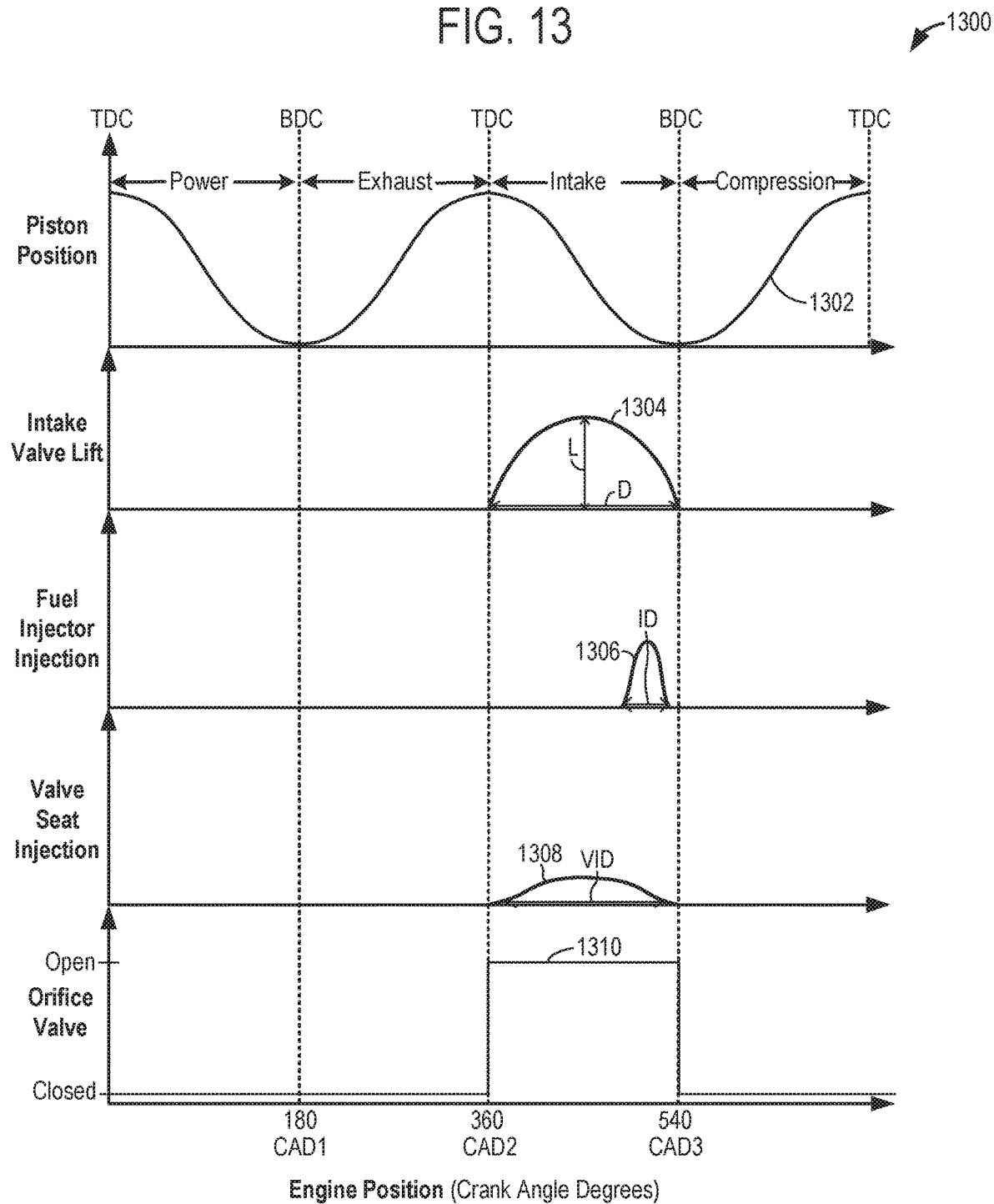

SYSTEM AND METHOD FOR VALVE SEAT INJECTION

FIELD

The present description relates generally to methods and systems for injecting fluid into a cylinder through an orifice in a valve seat.

BACKGROUND/SUMMARY

Internal combustion engines have been designed with multi-fuel capabilities. In certain cases, injection of the multiple fuels may be coordinated during a combustion cycle. Engines have, for example, utilized ethanol and water mixtures to increase combustion efficiency and reduce emissions. The water serves to provide targeted cooling for the intake charge to increase charge density. Specifically, water has the potential to decrease nitrogen oxide (NO) and carbon monoxide (CO) emissions in the exhaust. Igniting the alcohol during combustion additionally allows for increased power output. Exhaust systems have also used fluid injection system to spray diesel exhaust fluid into the exhaust upstream of a catalyst to reduce nitrogen oxide concentration.

U.S. Pat. No. 9,777,646 discloses an engine with a multi-fuel delivery system. In the system disclosed in U.S. Pat. No. 9,777,646 port and direct injectors are provided in the engine that are designed to deliver different types of fuel into the cylinder. The port fuel injector is designed to inject compressed natural gas while the direct injector is designed to deliver ethanol and petroleum-based fuel. Both systems utilize separate fuel injectors, fuel tanks, pumps, fuel lines, etc. These duplicate injection systems increase the manufacturing cost and complexity of the engine. As such, the systems may be susceptible to failure, malfunction, etc., thereby decreasing engine longevity, repair costs, etc.

The inventors have recognized several drawbacks with U.S. Pat. No. 9,777,646 and other secondary injection systems. In general, adding these additional injections system increases the engine's potential modes of failure, thereby decreasing engine longevity. Moreover, it is costly to manufacture engines with secondary injection systems. For instance, water and/or alcohol injection systems, separate from gasoline injection systems, require separate flow paths, expensive components, etc. Furthermore, the injection systems may increase the engine's profile and cause engine packaging issues.

In one example, the issues described above may be addressed by an engine system comprising a valve coupled to a first cylinder and including a valve head. The engine system also includes a valve seat including an injection orifice and mating with the valve head when the valve is in a closed configuration. Additionally, in a closed configuration the valve head obstructs fluid flow through the injection orifice and in an open configuration fluid flow through the injection orifice is unobstructed by the valve head. In this way, a fluid may be routed through a valve seat to increase the compactness of the fluid delivery assembly. Designing the valve seat with an orifice also increases the durability of the system when compared to secondary injection system with fluid injectors directly coupled to the cylinder. Designing a valve seat with an injection orifice also increases the assembly's compactness.

In one example, the valve is an intake valve and the injection orifice is in fluidic communication with a fluid reservoir containing at least one of water, alcohol, and a petroleum-based fuel. In this way, combustible fluid may be injected into the cylinder during an intake stroke. Consequently, fuel metering may be more precisely controlled and in some cases, multiple fuels may be delivered to the cylinder to increase combustion efficiency and decrease emissions.

In another example, the valve is an exhaust valve and the injection orifice is in fluidic communication with a fluid reservoir storing at least one of an exhaust fluid and air. In this way, exhaust fluid may be injected into an exhaust stream during an exhaust stroke to decrease emissions. In the case of air injection, the air may be used, in one example, during an exhaust sensor diagnostic routine. For instance, air may be injected into the exhaust stream and reading from an oxygen sensor during and subsequent to the air injection may be analyzed to establish if the sensor is functioning as desired. In this way, a reliable diagnostic routine can be carried out over a wide range of operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is a schematic depiction of a second example of an engine including an exhaust valve seat fluid delivery assembly.

FIG. 3 is a schematic depiction of an example of an engine including an intake valve seat fluid delivery assembly and an exhaust valve seat fluid delivery assembly.

FIG. 13 shows an example of a timing diagram for a valve seat fluid delivery assembly control strategy.

FIGS. 5-9 are shown approximately to scale. However, other relative dimensions may be used in other embodiments.

DETAILED DESCRIPTION

The following description relates to systems and methods for implementing fluid injection through an orifice in a valve seat. A valve seat fluid delivery assembly is used to guide fluid to the valve seat injection orifice. The fluid delivery assembly may include a fluid reservoir storing a fluid. When the injection orifice is included in an intake valve seat the fluid may be alcohol, water, petroleum-based fuel, combinations thereof, etc. In this way, the injection orifice may be operated to increase combustion efficiency, if desired. Conversely, when the injection orifice is included in an exhaust valve seat the fluid may be exhaust fluid, air, combinations thereof, etc. In this way, the injection orifice may be operated to decrease emissions, if desired.

A pump may also be included in the fluid delivery assembly and is designed to generate fluid flow from the reservoir to the valve seat injection orifice. Valve head position may dictate the injection state of the valve seat orifice. For instance, when the valve is open the valve seat orifice may inject fluid into the cylinder, in the case of an intake valve. In the case of an exhaust valve, the fluid may be injected around the valve seat and then travel downstream into the exhaust manifold. Conversely, when the valve is closed the valve head is seated on the valve seat blocking or partially blocking the injection orifice. Routing a fluid through injection openings in the valve seat allows fluid to be efficiently and compactly routed to the cylinders. As a result, the manufacturing costs of the engine can be driven down when compared to injection systems with separate injectors. Furthermore, the reliability of the engine can be improved when, for example, the injection orifice replaces a fluid injector, if desired.

Fluid injection through the orifice may be more granularly controlled, in some instances, through operation of a valve upstream of the injection orifice in a valve seat fluid delivery assembly. To elaborate, the injection of the fluid through the valve seat orifice may be delayed or in some cases prevented during selected combustion cycles. As such, the fluid injection may be adapted during transients, for example, to increase combustion efficiency and reduced emissions.

Figure 1:
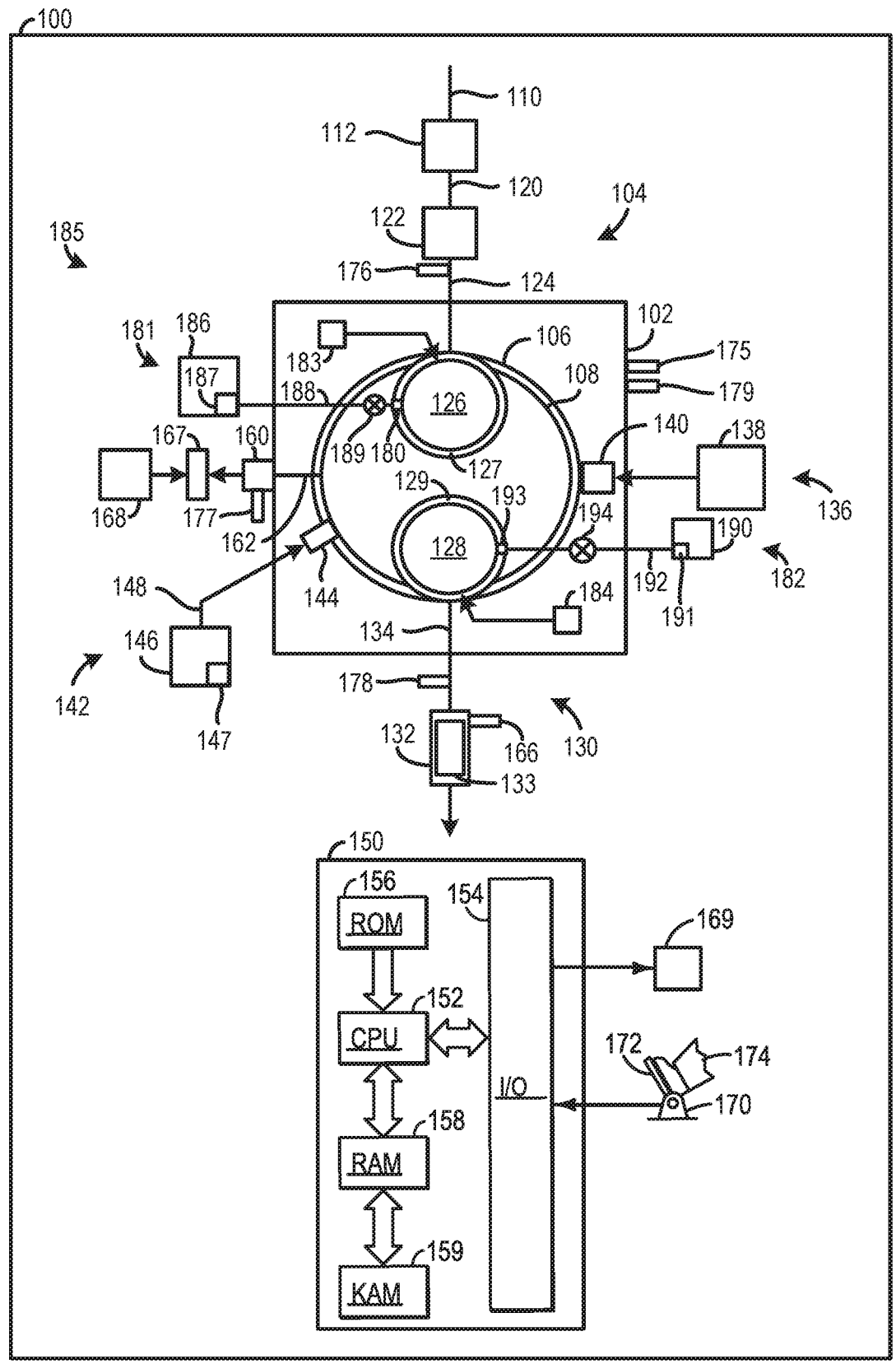
FIG. 1 is a schematic depiction of first example of an engine including an intake valve seat fluid delivery assembly and an exhaust valve seat fluid delivery assembly.
Figure 4:
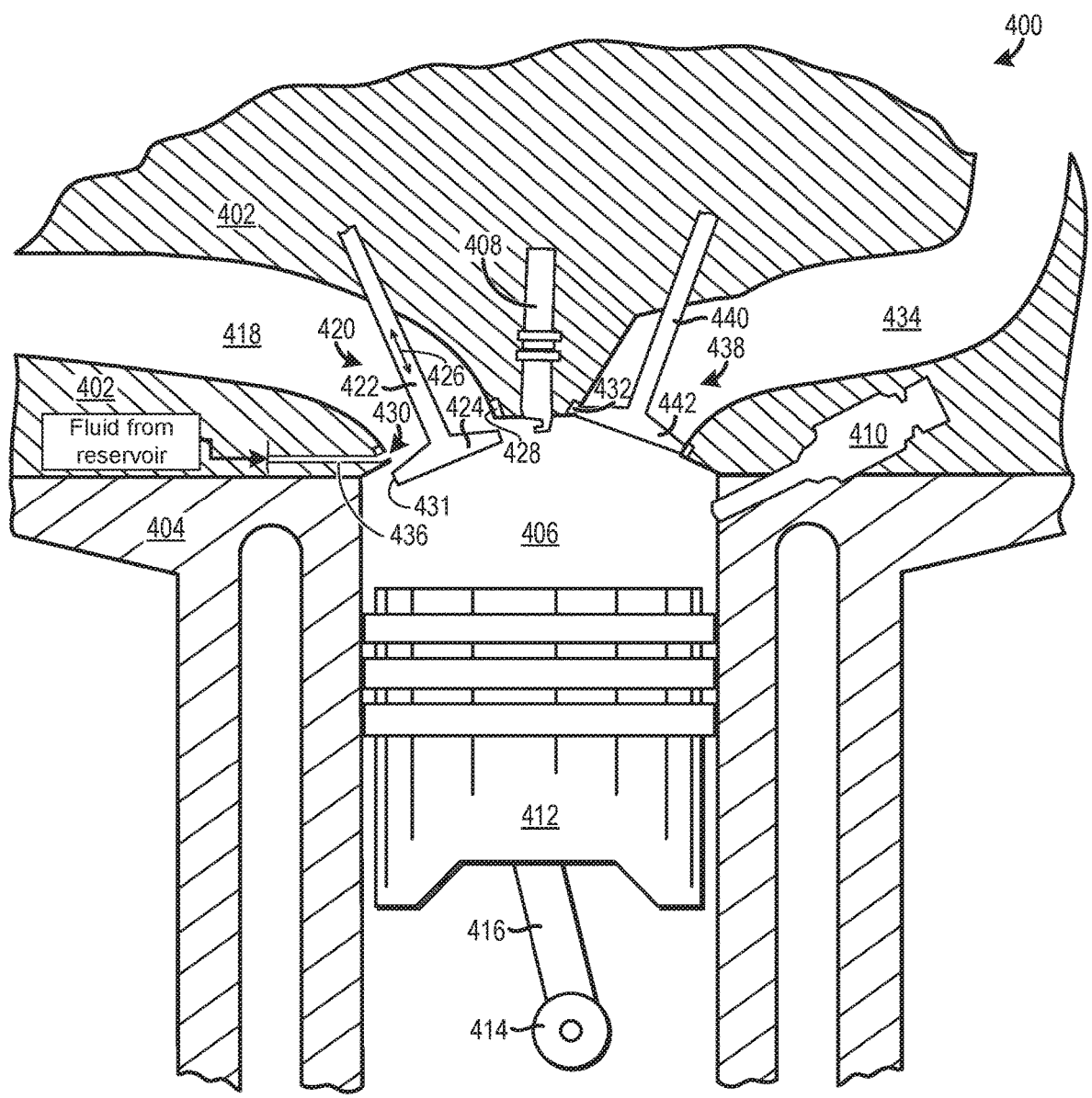
FIG. 4 shows a cross-sectional view of an example of an engine including an intake valve seat fluid delivery assembly.
Figure 8:
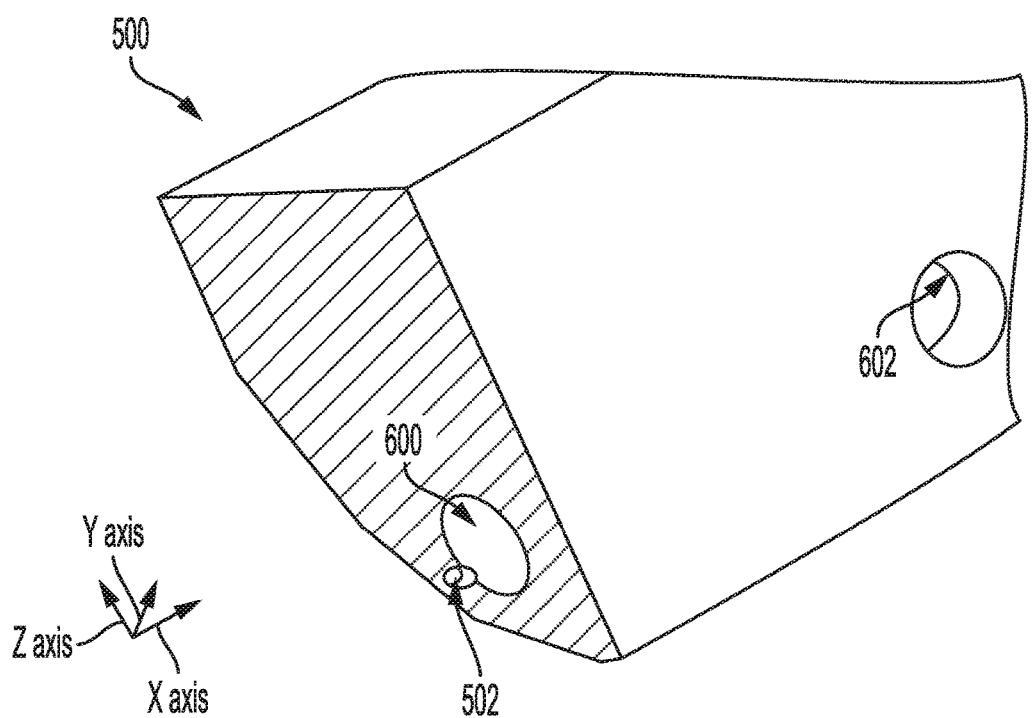
Figure 9:
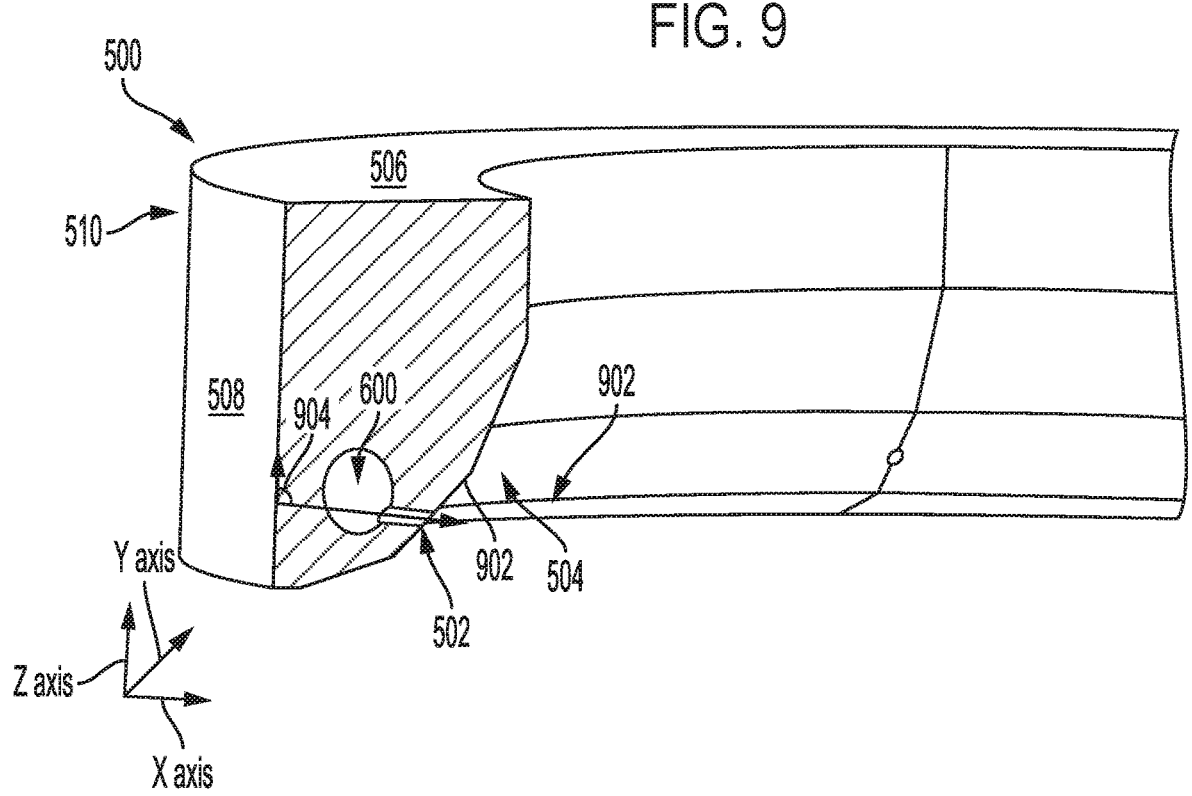
Figure 10:
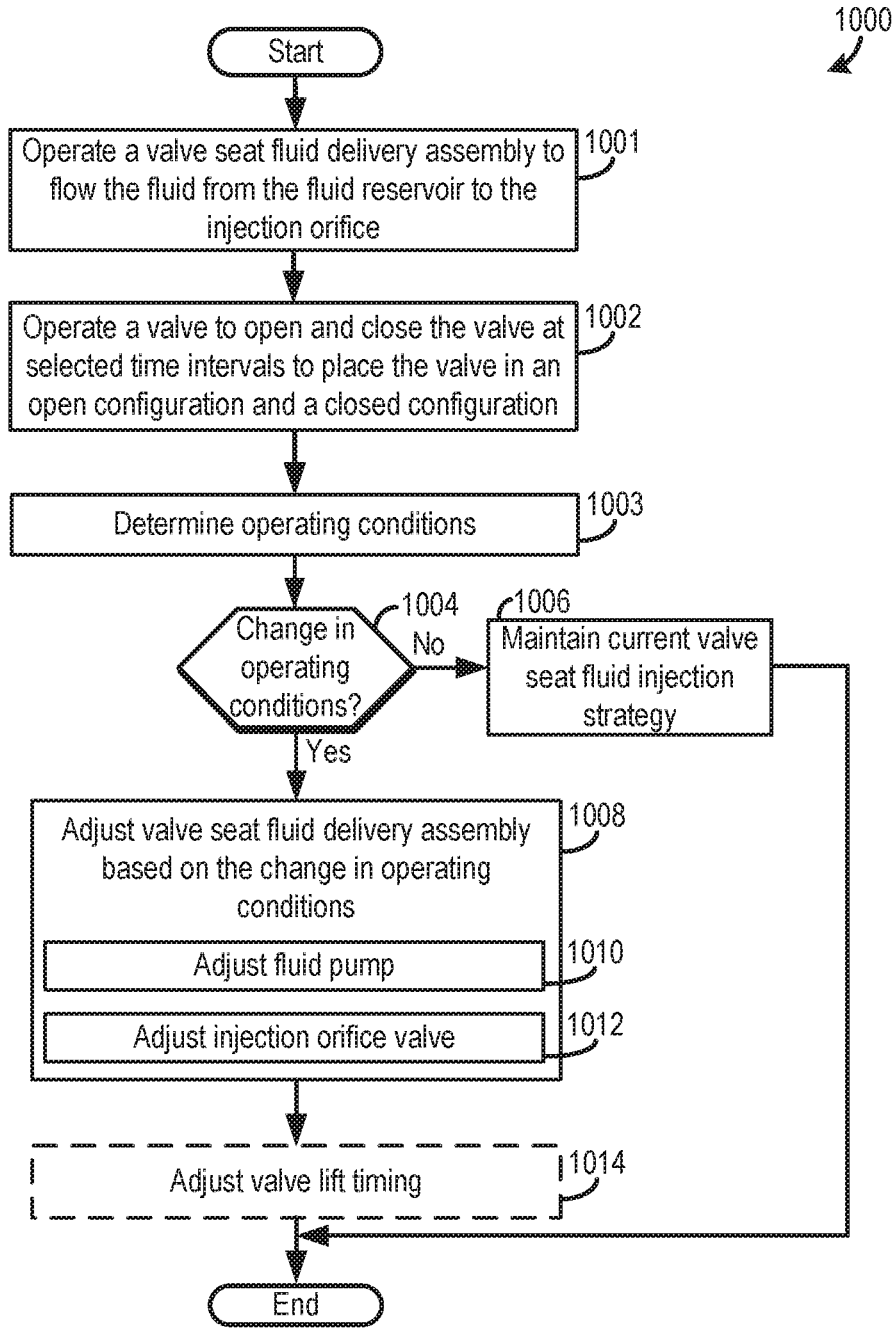
FIG. 10 shows a method for operating a valve seat fluid delivery assembly.
Figure 11:
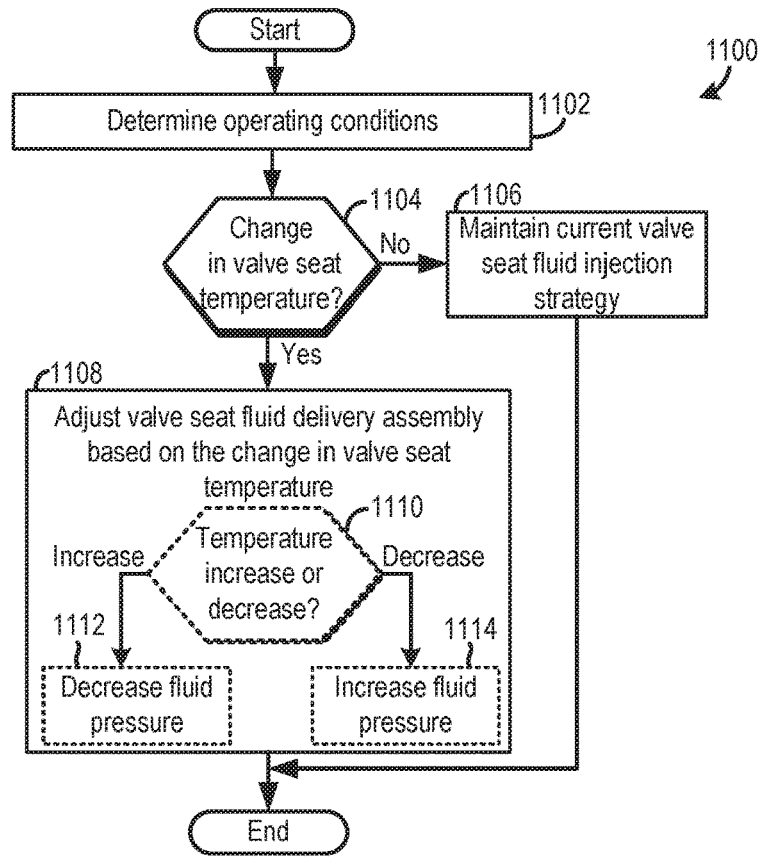
FIG. 11 shows a second method for operating a valve seat fluid delivery assembly.
Figure 12:
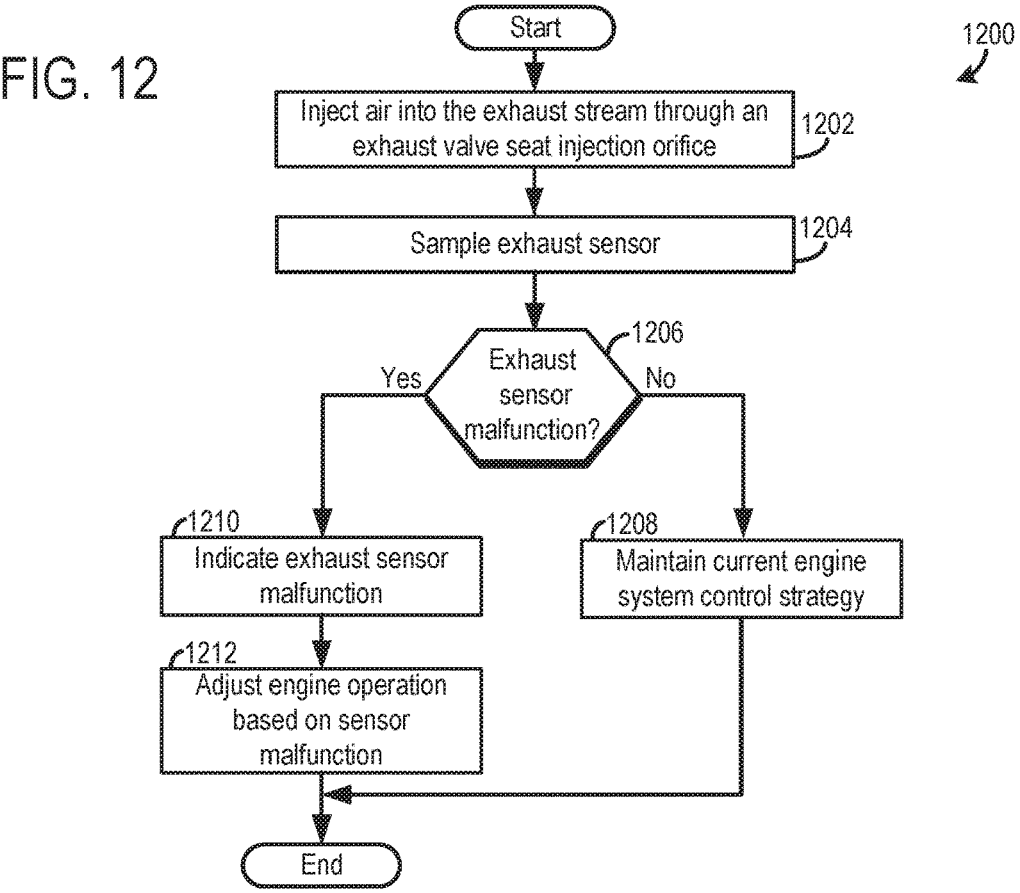
FIG. 12 shows a third method for operating a valve seat fluid delivery assembly.

FIG. 1 shows a schematic depiction an engine including an intake valve seat fluid delivery assembly and an exhaust valve seat fluid delivery assembly. FIG. 2 illustrates another example of an engine including an exhaust valve seat fluid delivery assembly coupled to one of two cylinders. FIG. 3 shows another example of an engine including an intake valve seat fluid delivery assembly coupled to two cylinders and an exhaust valve seat fluid delivery assembly coupled to one of the cylinders. FIG. 4 shows a sectional view of an engine including an intake valve seat fluid delivery assembly. FIGS. 5-9 show different views of a valve seat including a plurality of injection orifices. FIGS. 10-12 show different methods for operating valve seat fluid delivery assemblies. FIG. 13 shows a timing diagram for an exemplary valve seat fluid delivery assembly control strategy.

FIG. 1 shows a schematic representation of a vehicle 100 including an internal combustion engine 102. Although, FIG. 1 provides a schematic depiction of various engine and engine system components, it will be appreciated that at least some of the components may have different spatial positions and greater structural complexity than the components shown in FIG. 1.

An intake system 104 providing intake air to a cylinder 106 during desired time intervals, is also depicted in FIG. 1. A piston 108 is positioned in the cylinder 106. Although, FIG. 1 depicts the engine 102 with one cylinder and piston. The engine 102 may have additional cylinders and pistons, in other examples. For instance, the engine 102 may include a plurality of cylinders that may be positioned in various formations, such as in banks, in an inline configuration, etc.

The intake system 104 includes an air intake 110 providing intake air to an air filter 112 filtering airflow there through, in the illustrated example. However, in other examples the engine may not include the air filter or may include additional filtering devices.

The intake system 104 further includes an intake conduit 120 is in fluidic communication with the air filter 112. A throttle 122 is coupled to the intake conduit 120. The throttle 122 is configured to regulate the amount of airflow provided to the cylinder 106. For instance, the throttle 122 may include a rotatable plate varying the flowrate of intake air passing there through. In the depicted example, the throttle 122 feeds air to an intake conduit 124 (e.g., intake manifold). In turn, the intake conduit 124 directs air to an intake valve 126. The intake valve 126 opens and closes to allow intake airflow into the cylinder 106 at desired times. The intake valve 126, may include in one example, a poppet valve with a stem and a valve head seating and sealing on a valve seat 127 in a closed position. On the other hand, in an open configuration the intake valve head is spaced away from the intake valve seat 127. The intake valve seat 127 includes an injection orifice 180 extending there through. The injection orifice 180 receives fluid from an intake valve seat fluid delivery assembly 181, described in greater detail herein.

Further, in other examples, such as in a multi-cylinder engine additional intake runners may branch off the intake conduit 124 (e.g., intake manifold) and feed intake air to other intake valves. It will be appreciated that the intake conduit 124 and the intake valve 126 are included in the intake system 104. Moreover, the engine shown in FIG. 1 includes one intake valve and one exhaust valve. However, in other examples, the cylinder 106 may include two or more intake and/or exhaust valves.

An exhaust system 130 configured to manage exhaust gas from the cylinder 106 is also included in the vehicle 100, depicted in FIG. 1. The exhaust system 130 includes an exhaust valve 128 designed to open and close to allow and inhibit exhaust gas flow to downstream components from the cylinder. For instance, the exhaust valve may include a poppet valve with a stem and a valve head seating and sealing on a valve seat 129 in a closed position. On the other hand, when the exhaust valve 128 is open, the valve head is spaced away from the exhaust valve seat 129.

The exhaust system 130 also includes an emission control device 132 coupled to an exhaust conduit 134 (e.g., exhaust manifold). The emission control device 132 may include filters, catalysts, absorbers, combinations thereof, etc., for reducing tailpipe emissions. Specifically, in one example, the emission control device 132 may include a catalyst 133 (e.g., SCR catalyst). The catalyst 133 may be designed to interact with exhaust fluid (e.g., urea) to catalytically reduce nitrogen oxides in the exhaust stream into water and nitrogen. In this way, tailpipe emissions are reduced by the interaction between the catalyst and the exhaust fluid. It will be appreciated that the exhaust fluid may be delivered via an exhaust valve seat fluid delivery assembly 182.

The engine 102 also includes an ignition system 136 including an energy storage device 138 designed to provide energy to an ignition device 140 (e.g., spark plug). For instance, the energy storage device 138 may include a battery, capacitor, flywheel, etc. Additionally or alternatively, the engine 102 may perform compression ignition. As such, in one example, the ignition system 136 may be omitted from the engine 102 and compression may be used to ignite an air fuel mixture during the combustion cycles.

FIG. 1 also shows a fuel delivery system 142. The fuel delivery system 142 provides pressurized fuel to a fuel injector 144 from a fuel reservoir 146. The fuel reservoir 146 encloses a suitable fuel such as a petroleum-based fuel (e.g., gasoline, liquefied petroleum gas, diesel, etc.), alcohol (e.g., methanol, ethanol, etc.), biodiesel, etc.

In the illustrated example, the fuel injector 144 is a direct fuel injector coupled to cylinder 106. Additionally or alternatively, the fuel delivery system 142 may include a port fuel injector designed to inject fuel upstream of the cylinder 106 into the intake system 104. For instance, the port fuel injector may be an injector with a nozzle spraying fuel into an intake port at desired times. The fuel delivery system 142 includes a fuel pump 147 designed flow pressurized fuel to downstream components. For instance, the fuel pump 147 may be a pump driven by a crankshaft 160 with a piston and an inlet in the fuel tank that draws fuel into the pump and delivers pressurized fuel to downstream components. However, other suitable fuel pump configurations have been contemplated. Additionally or alternatively the fuel delivery system may include a second fuel pump (e.g., higher-pressure fuel pump) positioned external to the fuel tank. A fuel line 148 provides fluidic communication between the fuel pump 147 and the fuel injector 144. The fuel delivery system 142 may include additional components such as valves (e.g., check valves), return lines, etc., to enable the fuel delivery system to inject fuel at desired pressures and time intervals.

The vehicle 100 includes the crankshaft 160 receiving rotational input from the piston 108. Rods and/or other suitable mechanical components, indicated at 162, may be used transfer motion between the piston 108 and the crankshaft 160. It will be appreciated that the crankshaft 160 may be coupled to a transmission providing motive power to a drive wheel 167. Specifically, the transmission may include components such as a flywheel, a gearbox, clutch, driveshaft, etc., driving wheels (not shown) of the vehicle 100. An electric motor 168 receiving energy from an energy storage device may also provide motive power to the drive wheel 167, in some instances. In this way, the vehicle may be a hybrid vehicle. It will be appreciated that numerous hybrid type vehicle configurations have been contemplated such as parallel type hybrid systems, series type hybrid systems, etc. The energy storage device may be recharged via braking systems, from rotational output from the engine 102, etc., in some examples. In other examples, the electric motor 168 may be omitted from the vehicle 100.

During engine operation, the cylinder 106 typically undergoes a four-stroke cycle including an intake stroke, compression stroke, expansion stroke, and exhaust stroke. During the intake stroke, generally, the exhaust valve closes and intake valve opens. Air is introduced into the combustion chamber via the corresponding intake conduit, and the piston moves to the bottom of the combustion chamber so as to increase the volume within the combustion chamber. The position at which the piston is near the bottom of the combustion chamber and at the end of its stroke (e.g., when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel in the combustion chamber is ignited via a spark from an ignition device, resulting in combustion. However, in other examples, compression may be used to ignite the air fuel mixture in the combustion chamber. During the expansion stroke, the expanding gases push the piston back to BDC. A crankshaft converts this piston movement into a rotational torque of the rotary shaft. During the exhaust stroke, in a traditional design, exhaust valve is opened to release the residual combusted air-fuel mixture to the corresponding exhaust passages and the piston returns to TDC.

The engine 102 also includes an intake valve actuation system 183 and an exhaust valve actuation system 184. The intake valve actuation system 183 is designed to actuate the intake valve 126 at desired time intervals. Likewise, the exhaust valve actuation system 184 is designed to actuate the exhaust valve 128 at desired time intervals. To facilitate valve actuation camshafts driven via crankshaft rotational output may be employed to actuate poppet style valves. However, electronic type valve actuators have also been contemplated.

Further, in one example, the intake valve actuation system 183 may be a variable valve timing system designed alter the timing of a valve lift event of the intake valve 126. For instance, the timing of the intake valve 126 may be advanced or retarded by the intake valve actuation system 183. Additionally or alternatively, the exhaust valve actuation system 184 may be a variable valve timing system designed alter the timing of a valve lift event of the exhaust valve 128. For example, the timing of the exhaust valve 128 may be advanced or retarded by the exhaust valve actuation system 184. Mechanical systems such as cam phasing systems, cam switching systems, etc., may be used to alter valve lift timing in the intake and/or exhaust valve actuation systems, in some instances. However, in other instances, electro-hydraulic, electro-mechanical, electro-pneumatic, etc., type systems may be used to alter valve lift timing in the intake and/or exhaust valve actuation systems.

The engine 102 further includes the intake valve seat fluid delivery assembly 181 and an exhaust valve seat fluid delivery assembly 182 providing valve seat fluid injection capabilities during cylinder intake and exhaust strokes, respectively. For instance, the assemblies 181 and 182 are designed to allow fluid to be injected through orifices in the intake and exhaust valve seats. It will be appreciated that the intake and exhaust valve seat fluid delivery assemblies may be more generally referred to as valve seat fluid delivery assemblies. Additionally, the assembly 181 and/or the assembly 182 may be included in an engine system 185 that also includes the intake valve 126, intake valve seat 127, exhaust valve 128, and/or exhaust valve seat 129.

The intake valve seat fluid delivery assembly 181 includes a fluid reservoir 186 storing a fluid such as water, alcohol (e.g., ethanol, methanol, combinations thereof, etc.), petroleum-based fuel (e.g., gasoline, diesel, liquefied petroleum gas, etc.), biodiesel, mixtures of two or more of the aforementioned fuels (e.g., E85, M85, other suitable blends, etc.).

The intake valve seat fluid delivery assembly 181 also includes a fluid pump 187 designed to generate fluid flow between the fluid reservoir 186 and downstream components. The fluid pump 187 may be driven via an energy input from an energy storage device. However, in other examples, the fluid pump 187 may be driven via rotational input from the crankshaft 160. The fluid pump 187 and the other pumps described herein may include components such as a plunger, seals, vanes, etc., facilitating the generation of fluid flow in the assembly. As such, numerous pump designs have been contemplated such as a positive displacement pump, a centrifugal pump, etc. The fluid pump 187 may also be configured to regulate the pressure of the fluid in the intake valve seat fluid delivery assembly 181. For instance, the fluid pump 187 may be operated to increase and decrease fluid pressure in the intake valve seat fluid delivery assembly 181. The fluid pump 187 is shown positioned in the fluid reservoir 186. However, in other examples, the fluid pump 187 may be positioned external to the fluid reservoir 186.

A fluid line 188 connects the fluid pump 187 to the injection orifice 180 in the intake valve seat 127. Although, the intake valve seat 127 and the exhaust valve seat 129 are illustrated as each including one injection orifice. The intake and/or exhaust valve seats may include a plurality of injection orifices, in other examples. An injection orifice valve 189 is coupled to the fluid line 188. The injection orifice valve 189 may be a poppet style valve and/or driven via a solenoid. In this way, the fluid flowing through the intake valve seat injection orifice 180 may be adjusted. It will be appreciated that in other examples, the injection orifice valve 189 may be omitted from the intake valve seat fluid delivery assembly 181. In such, an example, the fluid pump 187 may regulate fluid metering through the injection orifice 180.

The exhaust valve seat fluid delivery assembly 182 includes a fluid reservoir 190 storing a fluid such as exhaust fluid (e.g., urea, urea and water, etc.), air, etc. A fluid pump 191 included in the exhaust valve seat fluid delivery assembly 182 is designed to generate fluid flow between the fluid reservoir 190 and downstream components. The fluid pump 191 is shown positioned in the fluid reservoir 190. However, in other examples, the fluid pump 191 may be positioned external to the fluid reservoir 190.

A fluid line 192 provides fluidic communication between the fluid pump 191 and an exhaust valve seat injection orifice 193. The exhaust valve seat injection orifice 193 extends through the exhaust valve seat 129 similar to the intake valve seat injection orifice 180.

An injection orifice valve 194 is coupled to the fluid line 192. The injection orifice valve 194 may be a poppet style valve, include a solenoid actuator, etc., similar to the valve 189, for instance. Therefore, the amount of fluid flow provided to the exhaust valve seat injection orifice 193 may be adjusted by the injection orifice valve 194, in one example. However, in other examples, the injection orifice valve 194 may be omitted form the assembly and the output of fluid pump 191 may dictate the amount of fluid injected through the injection orifice 193.

FIG. 1 also shows a controller 150 in the vehicle 100. The controller 150 receives signals from the various sensors of FIG. 1 and employs the various actuators of FIG. 1 to adjust engine operation based on the received signals and instructions stored on a memory of the controller. Specifically, controller 150 is shown in FIG. 1 as a conventional microcomputer including: microprocessor unit 152, input/output ports 154, read-only memory 156, random access memory 158, keep alive memory 159, and a conventional data bus. Controller 150 is configured to receive various signals from sensors coupled to the engine 102 and send command signals to actuators in components in the vehicle, such as the throttle 122. Additionally, the controller 150 is also configured to receive pedal position (PP) from a pedal position sensor 170 coupled to a pedal 172 actuated by an operator 174. Therefore, in one example, the controller 150 may receive a pedal position signal and adjust actuators in the throttle based the pedal position signal to vary engine speed. It will be appreciated that other components receiving command signals from the controller may function in a similar manner. For instance, the injection orifice valve 189 may include an actuator and the actuator may alter the fluid flow based on signals received from sensors. The sensors may include an engine temperature sensor 175, mass airflow sensor 176, engine speed sensor 177, exhaust sensor 178 (e.g., oxygen sensor, exhaust temperature sensor, combinations thereof, etc.), knock sensor 179, emission device temperature sensor 166, etc. The engine temperature sensor 175 generates signals indicative of engine temperature. The mass airflow sensor 176 generates signals indicative of airflow through the intake manifold. The engine speed sensor 177 generates signals indicative of engine speed. The exhaust sensor 178 generates signals indicative of exhaust gas composition (e.g., oxygen concentration), exhaust gas temperature, etc. In other examples, separate sensors may generate signals indicative of each of oxygen concentration, exhaust gas temperature, etc. The knock sensor 179 may generate signals indicative of engine vibration correlated to engine knock. The controller 150 is also shown in electronic communication with a sensor malfunction indicator 169. The indicator 169 may include a visual, audio, and/or haptic device that may be positioned in a vehicle cabin, for example.

The controller 150 is configured to adjust the fluid pump 187 to alter fluid injection metering and/or timing through the intake valve seat injection orifice 180 in response to a change in one or more engine operating conditions. For instance, responsive to an increase in engine temperature the amount of alcohol and water injected into the cylinder 106 through the injection orifice 180 may be increased. On the other hand, when the engine temperature decreases, the amount of alcohol and water injected into the cylinder 106 through the injection orifice 180 may be decreased.

Likewise, the controller 150 is configured to adjust the fluid pump 191 to alter fluid injection metering and/or timing through the exhaust valve seat injection orifice 193 in response to a change in one or more engine operating conditions. In this way, fluid delivered into an exhaust stream via the exhaust valve seat may also be controlled to for example, reduce emissions, implement sensor diagnostic routines, etc., for example.

The controller 150 is also configured to alter the metering and/or timing of fluid injection through the intake valve seat injection orifice 180 through adjustment of the injection orifice valve 189 based on engine operating conditions. For instance, the controller 150 may be configured to adjust the injection orifice valve to retard fluid injection from the injection orifice into the cylinder 106 when the valve is in an open configuration responsive to a change in at least one engine operating condition. The operating conditions may include engine knock, engine temperature, intake manifold pressure, exhaust gas composition, exhaust gas temperature, etc. It will be appreciated that the valve 194 may also be adjusted to adjust the timing and/or metering of fluid injection through the exhaust valve seat injection orifice 193.

The controller 150 may also configured to advance and retard valve lift timing of the intake valve 126 and/or the exhaust valve 128 to advance or retard injection of fluid through the injection orifice 180 and/or the injection orifice 193. For example, valve lift of the intake valve may be advanced to advance the timing of fluid injection through the intake valve seat injection orifice 180. It will be appreciated that actuation of valve 189 may be coordinated with the adjustments in valve lift timing, in such an example. For instance, the injection orifice valve 189 may be opened while the intake valve is lifted. However, in other examples, the injection orifice valve 189 may be held closed for a duration during intake valve lift to retard fluid injection through the valve seat injection orifice. It will also be appreciated that the intake valve seat fluid delivery assembly 181 may not include an injection orifice valve when the engine includes variable valve timing systems, in some examples.

Furthermore, engine temperature may alter the size and/or profile of the injection orifice 180 and/or injection orifice 193. These geometric changes in the injection orifices may be taken into account when calculating fluid metering through the orifice. For instance, as the engine temperature increases the size of the injection orifices may increase. As such, fluid pump output may be decreased to compensate for the orifice expansion. However, as engine temperature decreases the size of the orifice may decrease and therefore the decrease in fluid flowrate may also be compensated for by increasing fluid pump output. Look-up tables may be designed to incorporate the temperature compensation, for instance.

The controller 150 may also be configured to implement an exhaust sensor (e.g., oxygen sensor) diagnostic routine responsive to injection of air through the exhaust valve seat injection orifice 193. For example, the exhaust valve seat fluid delivery assembly 182 may inject air through the injection orifice 193. During and subsequent to the air injection, samples from the exhaust gas sensor (e.g., oxygen sensor) may be taken. The samples from the exhaust gas sensor may be compared to expected sensor sample values to ascertain sensor functionality. For instance, if the disparity between the sensor samples and the expected sensor sample values is greater than a threshold value, it may be determined that the sensor is malfunctioning. In one example, the threshold value may be between 0% and 21% oxygen ($O_2$). If it is determined that the sensor is malfunctioning, the controller may set a flag and/or trigger the sensor malfunction indicator 169.

Additionally, the controller 150 may be configured to operate the intake valve seat fluid delivery assembly 181 to decrease cold start emissions. For instance, fuel may be injected into the cylinder through the intake valve seat injection orifice when the engine is below a threshold temperature (e.g., 100° F., 150° F., 175° F., when the ambient temperature is less than cylinder head and/or engine coolant temperature, when the oil temperature, ambient temperature, and/or cylinder head temperature are all within +/−20° F., etc.) to prime the cylinder for a cold start.

FIGS. 2-3 show a second example of an engine 200 and a third example of an engine 300, respectively. The engines, shown in FIGS. 2-3, may include similar components to the engine 102, shown in FIG. 1. For instance, the engines may each include an intake system, exhaust system, a cylinder, etc. Therefore, redundant description of common components, features, etc., is omitted.

FIG. 2 specifically shows a second example of the engine 200 with an exhaust valve seat fluid delivery assembly 202 designed to deliver a fluid (e.g., exhaust fluid (e.g., urea), air, etc.) to an exhaust stream through an injection orifice 204 in a valve seat 206 for an exhaust valve 208 coupled to a first cylinder 210. However, as shown, a second cylinder 212 in the engine 200 does not include an exhaust valve seat injection orifice. As such, a second injection orifice in the exhaust valve seat 214 of an exhaust valve 216 in the second cylinder 212, is not provided, in the illustrated example. Thus, the exhaust valve seat 214 in the second cylinder 212 shown in FIG. 2 may form a continuous and uninterrupted surface without any orifices. Such a configuration may be desired when the exhaust valve seat fluid delivery assembly 202 utilizes exhaust fluid. For example, the desired amount of fluid injection for reducing emissions may not exceed the amount of fluid delivered by a single exhaust valve seat and the corresponding injection orifice(s).

However, in other examples a second injection orifice may be provided in the exhaust valve seat 214. In such an example, the second injection orifice may receive fluid from a reservoir 218 included in the assembly 202, in one example, or from a second fluid reservoir, in another example.

The exhaust valve seat fluid delivery assembly 202 includes the reservoir 218 storing a fluid (e.g., exhaust fluid, air, etc.). The assembly 202 also includes a fluid pump 220 generating fluid flow between the reservoir 218 and the exhaust valve seat injection orifice 204. An injection orifice valve 222 is coupled to a fluid line extending between the fluid pump 220 and the exhaust valve seat injection orifice 204. The injection orifice 204 extends through the valve seat 206. FIG. 2 also shows intake valves 224 and intake valve seats 226 associated with the first and second cylinders 210 and 212.

FIG. 3 shows a third example of an engine 300 with an intake valve seat fluid delivery assembly 302. FIG. 3 shows an exhaust valve seat fluid delivery assembly 304 similar to the exhaust valve seat fluid delivery assembly 202, shown in FIG. 2. For instance, fluid from a fluid pump 305 in a reservoir 306 may be delivered to an injection orifice 308 in an exhaust valve seat 310 in an exhaust valve 312 during selected time periods. The exhaust valve 312 is coupled to a first cylinder 314. Redundant description of common components in the exhaust valve seat fluid delivery system is omitted.

FIG. 3 also shows the intake valve seat fluid delivery assembly 302 including a fluid reservoir 316 storing a fluid such as alcohol, water, petroleum-based fuel, etc. The intake valve seat fluid delivery assembly 302 also includes a fluid pump 318 generating fluid flow through a fluid line 320 extending between the fluid pump and an intake valve seat injection orifice 322. The intake valve seat injection orifice 322 extends through an intake valve seat 324 mating with a head of an intake valve 326 when the valve is closed. An injection orifice valve 328 included in the intake valve seat fluid delivery assembly 302 is also shown in FIG. 3. The orifice valve 328 regulates the fluid flow in the assembly 302.

FIG. 3 also shows a fluid line 330 extending between the fluid pump 318 and an injection orifice 332 in an intake valve seat 334. The intake valve seat 334 is associated with an intake valve 336 coupled to a second cylinder 338. An injection orifice valve 339 is coupled to the fluid line 330 and regulates fluid flow there through. An exhaust valve 340 coupled to the second cylinder 338 is also shown in FIG. 3. It will be appreciated that a valve seat 342 associated with the exhaust valve 340 does not include any injection orifices, in the illustrated example. However, in other examples, the exhaust valve seat fluid delivery assembly 304 may route fluid to an orifice in the valve seat 342.

FIG. 4 shows a cross-sectional view of an example of an engine 400. It will be appreciated that the engine 400 is an example of any of the engines described above with regard to FIGS. 1-3. As such, the engine 400 may share common features, functions, structures, etc., with the engines described above with regard to FIGS. 1-3.

The engine 400 is shown including a cylinder head 402 coupled to a cylinder block 404 forming a cylinder 406. An ignition device 408 and fuel injector 410 are coupled to the cylinder 406. Although the fuel injector 410 is depicted as a direct injector, port injection may additionally or alternatively be implemented in the engine 400. Additionally, a piston 412 is disposed in the cylinder 406 and is rotationally coupled to a crankshaft 414 via a piston rod 416 or other suitable mechanical coupling.

The engine 400 further includes an intake conduit 418 (e.g., runner, manifold, etc.) directing intake air into the cylinder 406. Additionally, an intake valve 420 regulates airflow into the cylinder 406. The intake valve 420 includes a valve stem 422 and a valve head 424. The valve head 424 moves in opposing axial directions with regard to an axis 426 of the stem 422 during valve opening and closing. The valve head 424 is shown in an open configuration in FIG. 4. As such, an intake stroke is occurring in the engine 400 shown in FIG. 4. In the open configuration, the valve head 424 is spaced away from a valve seat 428 in the cylinder head 402. On the other hand, when the intake valve 420 is in a closed configuration the valve head 424 is mated with the valve seat 428.

FIG. 4 also shows an injection orifice 430 in the intake valve seat 428. Specifically, the injection orifice 430 extends through an outer surface of the valve seat 428. As previously discussed, when the intake valve head 424 is spaced away from the valve seat 428, the injection orifice 430 is unblocked. On the other hand, when the intake valve head 424 is mated with the valve seat 428 the injection orifice 430 is blocked. As described herein a block state of the orifice is a configuration where fluid is substantially inhibited from flowing from the orifice into an area surrounding the valve seat. It will be appreciated that a face 431 of the valve head 424 extends across or at least partially across the injection orifice 430 when the intake valve 420 is closed. In this way, the face 431 obstructs (e.g., blocks) the orifice 430 in the closed configuration.

On the other hand, an unblocked state of the orifice is a configuration where fluid is permitted to flow through the orifice into an area surrounding the valve seat. When the injection orifice 430 is included in the intake valve seat 428, as is the case in FIG. 4, the fluid from the orifice travels into the cylinder 406. In examples where the orifice is in the exhaust valve seat 432, the fluid flows into an exhaust stream traveling from the cylinder to the exhaust conduit 434 (e.g., manifold, runner, etc.). Therefore, when the valve is closed the fluid flow through the injection orifice is obstructed by the valve head.

The injection orifice 430 is shown in fluidic communication with a fluid line 436. The fluid line 436 may receive fluid from upstream components such as the injection orifice valve, fluid pump, and fluid reservoir. In one example, the injection orifice 430 may be supplied via external plumbing such as ducting, solid lines, flex lines, and/or internal head passageways (e.g., cast, machined, or solid lines), or a combination of any of the above.

FIG. 4 also shows an exhaust valve 438 with a valve stem 440 and a valve head 442. The valve head 442 of the exhaust valve 438 is mated with the exhaust valve seat 432. The exhaust conduit 434 receives exhaust flow from the cylinder 406 when the exhaust valve 438 is opened.

FIGS. 5-9 show an example of a valve seat 500 with a plurality of injection orifices 502. Although, the valve seat 500 may include one orifice, in other examples. The valve seat 500 is an example of any of the intake valve seats or exhaust valve seats, previously described with regard to FIGS. 1-3. Axes X, Y, and Z are provided in FIGS. 5-9 as a visual reference. Each of the axes are perpendicular to one another. However, other orientations of the axes have been contemplated.

Figure 5:
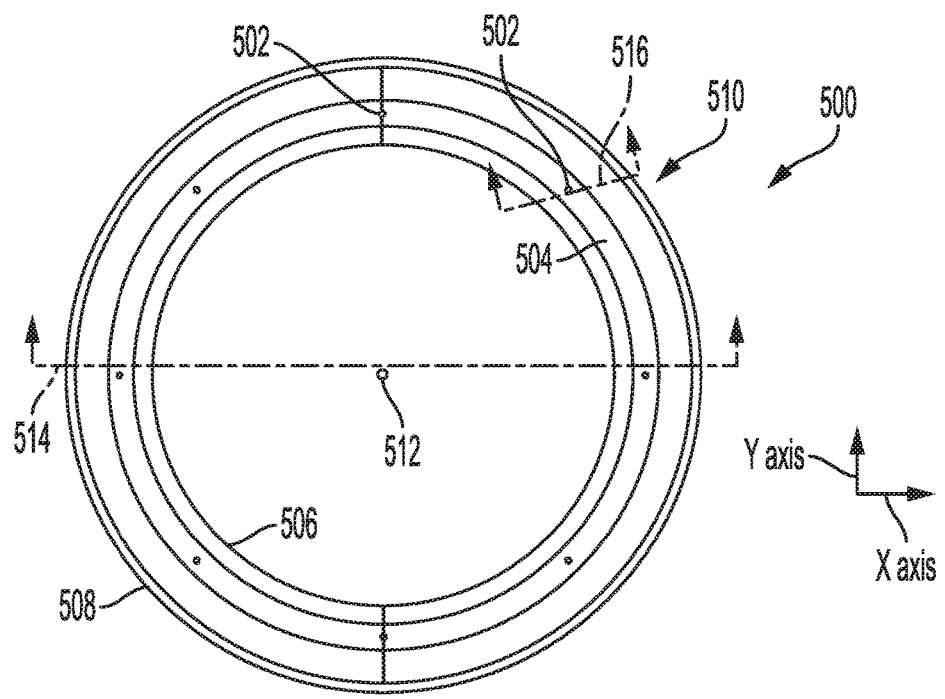
FIGS. 5-9 show different views of a valve seat including injection orifices that may be included in any of the valve seat fluid delivery assemblies shown in FIGS. 1-3.

FIG. 5 specifically shows a top view of the valve seat 500. The valve seat 500 includes a top surface 504 through which the injection orifices 502 extend. The valve seat 500 further includes a lower surface 506 and a peripheral surface 508 (e.g., circumferential surface). The valve seat 500 also includes a valve seat body 510.

Figure 6:
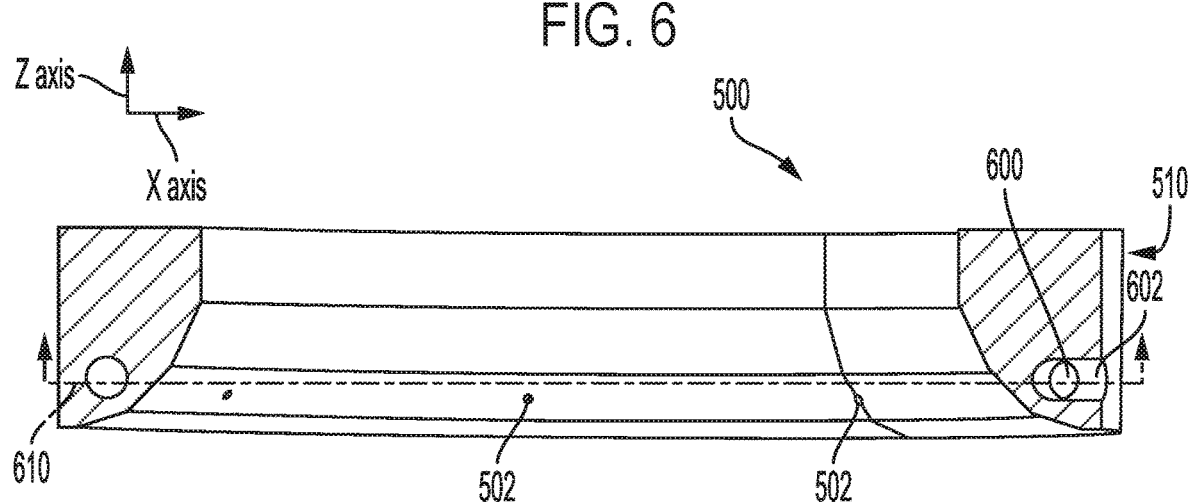
Figure 7:
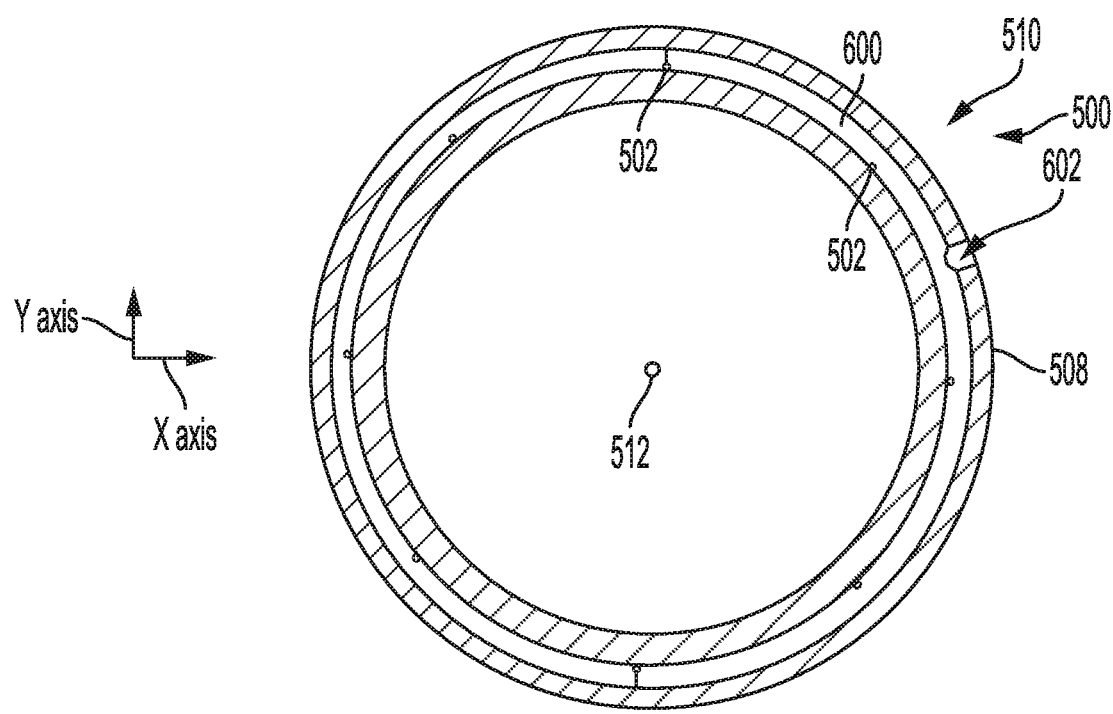

The injection orifices 502 are cylindrical in shape in the illustrated example. However, other orifice contour have been contemplated. For instance, the orifices may be curved. The injection orifices 502 are evenly spaced with regard to their circumferential position around a central axis 512. Specifically, the injection orifices 502 are sequentially spaced apart 45 degrees with regard to one another. However, numerous orifice spacing arrangements have been contemplated. For example, the orifices may be consecutively spaced by 30 degrees. In other examples, the orifices 502 may not be evenly spaced and/or symmetrically spaced around the central axis 512. For instance, orifices may be placed on one side of the valve seat while the other side of the valve seat retains a continuous surface without orifices. Viewing plane 514 defining the cross-sectional view shown in FIG. 6 is indicated in FIG. 5. Viewing plane 516 defining the cross-sectional views shown in FIGS. 8 and 9 is also indicated in FIG. 5.

An orifice supply conduit 600 is shown extending circumferentially around the valve seat body 510, in FIG. 6. Other conduit contours may be used, in other examples, however. For instance, the orifice supply conduit 600 may extend radially and/or vertically through the valve seat body 510. The orifice supply conduit 600 supplies the plurality of orifices 502 with fluid (e.g., water, alcohol, petroleum-based fuel, exhaust fluid (e.g., urea), air, etc.).

An orifice supply conduit inlet 602 is also shown in FIG. 6. The orifice supply conduit inlet 602 receives fluid from upstream component in the assembly such as an injection orifice valve, fluid pump, fluid reservoir, etc. Specifically, the fluid may be supplied via any of the fluid pumps in the valve seat fluid delivery assemblies described herein with regard to FIGS. 1-4. Viewing plane 610 defining the cross-sectional view shown in FIG. 6 is indicated in FIG. 6.

FIG. 7 again shows the valve seat 500 including the orifice supply conduit 600 and the orifice supply conduit inlet 602. The orifice supply conduit inlet 602 is shown extending radially through the valve seat body 510 from the peripheral surface 508 of the valve seat 500. However, other suitable locations and profiles of the orifice supply conduit inlet 602 have been envisioned. Additionally, the orifice supply conduit 600 is shown circumferentially extending around the central axis 512 of the valve seat 500. However, other conduit contours have been envisioned. The injection orifices 502 are shown extending inwards toward the central axis 512 from the orifice supply conduit 600.

FIG. 8 shows another view of the valve seat 500 with the orifice supply conduit inlet 602, orifice supply conduit 600, and the injection orifices 502.

FIG. 9 shows, in cross-section, one of the injection orifices 502 extending through the valve seat body 510 from the orifice supply conduit 600 to an interior space 900 at least partially bounded by the valve seat 500. Specifically, the injection orifice shown in FIG. 8 extends through an angled portion 902 of the top surface 504 of the valve seat 500. It will be appreciated that the angled portion 902 mates with a valve head of an intake valve or an exhaust valve. As shown, an angle 904 is formed between a central axis of one of the injection orifices 502 and the peripheral surface 508 of the valve seat 500.

The angle 904 may be between 45 and 60 degrees, in one example. However, in other examples the angle may be between 0 and 180 degrees. Further in one example, the orifice may have coined, laser clad, arcs and radii call outs or any contoured geometries. In yet another example, the orifice may include applied coatings such as plasma transfer wire arc (PTWA), laser clad, metal deposition, etc. However, other angle or angle ranges have been envisioned. The lower surface 506 of the valve seat 500 is also shown in FIG. 5.

Additionally, the valve seat injection orifices 502, shown in FIGS. 4-9, may be formed via casting in one example or drilling in other examples. Further, in other examples, the valve seat injection orifices may be additively manufactured.

FIGS. 4-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Additionally, elements with decreasing or increasing sectional profiles may be referred to as tapered elements.

FIG. 10 shows a method 1000 for operating an engine system. The method 1000 as well as the other methods described herein may be carried out by the engine systems and valve seat fluid delivery assemblies described above with regard to FIGS. 1-9. However, in other examples the method 1000 and the other methods described herein may be implemented by other suitable engine systems, valve seat fluid delivery assemblies, etc. Furthermore, instructions for carrying out method 1000 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 1001 the method includes operating a valve seat fluid delivery assembly to flow a fluid (e.g., alcohol, water, petroleum-based fuel, exhaust fluid, air, etc.) from the fluid reservoir to the injection orifice in the valve seat. In this way, the injection orifice may be prepped for injection.

At 1002 the method includes operating the valve to open and close the valve at selected time intervals to place the valve in an open configuration and a closed configuration. It will be appreciated that a valve head of the valve mates with the valve seat in a closed configuration thereby blocking the injection orifice. On the other hand, the valve head is spaced away from the valve seat when the valve is opened thereby unblocking the injection orifice. In this way, fluid flow through the injection orifice is augmented based on the position of the valve.

At 1003 the method includes determining engine operating conditions. The operating conditions may include but are not limited to engine speed, engine temperature, exhaust gas temperature, intake manifold pressure, exhaust gas composition, etc. The operating conditions may be determined using signals gathered from sensors in the engine and/or other data inputs. For instance, cylinder temperature may be generated using samples from a temperature sensor coupled to the cylinder or may be estimated based on samples from an engine coolant temperature sensor, algorithms correlating coolant temperature and cylinder temperature, etc.

At 1004 the method includes determining if a change in engine operating conditions has occurred. For instance, it may be determined that engine temperature has increased or decreased. In other examples, it may be determined if engine speeds has increased or decreased.

If it is determined that a change in engine operating conditions has not occurred (NO at 1004) the method proceeds to 1006. At 1006 the method includes maintaining current valve seat fluid injection strategy. For instance, predetermined valve seat injection timing and/or metering values may be maintained, in the engine system. As such, the fluid pump and/or injection orifice valve may be operated to carry out the predetermined valve seat injection timing and/or metering strategy.

On the other hand, if it is determined that a change in engine operating conditions has occurred (YES at 1004) the method proceeds to 1008. At 1008 the method includes adjusting valve seat fluid delivery assembly based on (e.g., responsive to) the change in operating conditions.

Step 1008 may include steps 1010-1012. At 1010 the method includes adjusting the fluid pump and at 1012 the method includes adjusting the injection orifice valve. For example, the fluid pump output may be increased and the injection orifice valve may be opened in response to an increase in engine temperature to increase an amount of fluid injected through the intake valve seat injection orifice. In other examples, the fluid pump output may be decreased to decrease the amount of exhaust fluid injected through the exhaust valve seat when it is determined that a nitrogen oxide conversion ratio in the catalyst has reached or surpassed a desired level. In this way, exhaust fluid injection metering through the injection orifice may be adjusted in response to conditional changes in an emission control device in an exhaust system downstream of the valve.

At 1014 the method may include adjusting valve lift timing to alter metering and/or timing of fluid injection through a valve seat orifice. For instance, valve lift timing of an intake valve may be advanced to advance the injection of a fluid (e.g., alcohol, water, petroleum-based fuel, etc.) through an intake valve seat injection orifice. In other examples, valve lift timing of an exhaust valve may be retarded to delay the injection of a fluid (e.g., exhaust fluid, air, etc.) from an exhaust valve seat injection orifice. It will be appreciated that the valve lift timing may be adjusted by variable valve timing systems coupled to the intake and/or exhaust valves.

FIG. 11 shows another method 1100 for controlling an engine system. At 1102 the method includes determining engine operating conditions. For example, the temperature of the valve seat may be determined using one or more sensor reading from temperature sensors in the engine. It will be appreciated additional or alternative operating conditions may be determined at step 1102 which may include any of the operating conditions discussed with regard to step 1003 in FIG. 10.

Continuing with FIG. 11, at 1104 the method includes determining if a change greater than a threshold value has occurred in the valve seat temperature. Numerous threshold changes have been contemplated, such as 0.5° F., 1° F., 5° F., 10° F., 20° F., etc.

If it is determined that a change greater than the threshold value in the valve seat temperature has not occurred (NO at 1104) the method proceeds to 1106. At 1106 the method includes maintaining current valve seat fluid injection strategy. For example, predetermined valve seat injection timing and/or metering values may be maintained. As such, the fluid pump and/or injection orifice valve may be operated to carry out the predetermined valve seat injection timing and/or metering strategy.

On the other hand, if it is determined that a change greater than the threshold value in the valve seat temperature has occurred (YES at 1104) the method moves to 1108. At 1108 the method includes adjusting the valve seat fluid delivery assembly based on the change in valve seat temperature. Step 1108 may include steps 1110-1114, one example.

At 1110 the method may include determining if a valve seat temperature increase or decrease has occurred. If it is determined that the valve seat temperature has increased the method includes at 1112, decreasing fluid pressure in the valve seat fluid delivery assembly. For instance, an output of the fluid pump in the assembly may be decreased and/or the injection orifice valve may be closed or partially closed to decrease the pressure of the fluid at the injection orifice in the valve seat. In this way, a temperature increase causing the size of the injection orifice to increase may be compensated for by decreasing fluid pressure in the assembly. However, in other examples, the amount of fluid flowing through the valve seat fluid delivery assembly may be increased to increase valve seat cooling via the fluid flowing there through. In one example, the valve seats may be cooled via internal passages that allow coolant to flow from water jacket into and around the seat passages and returning back into the water jacket passage way via a traditional design or active and/or external plumbing for separate coolant controlled cooling and/or thermal management strategies may be used, in other examples.

On the other hand, if it is determined that the valve seat temperature has decreased the method includes at 1114, increasing fluid pressure in the valve seat fluid delivery assembly.

For instance, an output of the fluid pump in the assembly may be increased and/or the injection orifice valve may be opened or partially opened to increase the pressure of the fluid at the injection orifice in the valve seat. In this way, a temperature decrease causing the size of the injection orifice to decrease may be compensated for by decreasing fluid pressure in the assembly. FIG. 12 shows another method 1200 for controlling an engine system. At 1202 the method includes injecting air into an exhaust stream through an exhaust valve seat injection orifice. It will be appreciated that the air may be injected when the exhaust valve is open and the injection orifice in the valve seat is unblocked.

At 1204 the method includes sampling an exhaust sensor (e.g., an oxygen sensor). For instance, an exhaust sensor may be sampled during a time period starting at the injection of the air into the exhaust stream and ending at subsequent time. In this way, sensor readings may be taken when the injected air travels past the sensor.

At 1206 the method includes determining if the exhaust sensor is malfunctioning. In one example, the sensor samples taken at 1204 may be compared to expected values to ascertain of the exhaust sensor is malfunctioning. For instance, an increase in oxygen concentration may be expected subsequent to the injection. If the sensor readings indicate an expected increase in oxygen concentration, it may be determined that the sensor is not malfunctioning. However, if the sensor readings do not indicate an expected increase in oxygen concentration, it may be determined that the exhaust sensor is malfunctioning.

If it is determined the exhaust sensor is not malfunctioning (NO at 1206), the method moves to 1208. At 1208 the method includes maintaining the current engine system operating strategy. For example, the engine system may be operated according to predetermined set-points.

However, if it is determined the exhaust sensor is malfunctioning (YES at 1206), the method advances to 1210. At 1210 the method includes indicating exhaust sensor malfunction. Indicating exhaust sensor malfunction may include triggering a flag, triggering a sensor malfunction indicator (e.g., a visual, audio, and/or haptic indicator), etc. Next at 1212 the method includes adjusting engine operation based on the sensor malfunction determination. For instance, the engines speed may be limited, fuel injection and/or valve timing may be adjusted, etc. However, in other examples step 1212 may be omitted from the method 1200.

Method 1200 allows air injected through an exhaust valve seat injection orifice to be used in an exhaust sensor (e.g., oxygen sensor) diagnostic routine. As a result, the reliability of the diagnostic algorithm may be increased and the diagnostic algorithm may be implemented over a wide range of engine operating conditions, when compared to previous strategies that do not rely on air injected into the exhaust stream.

Now turning to FIG. 13, depicting example piston position, intake valve timing, fuel injector timing, valve seat fluid injection timing, and injection orifice valve actuation timing, such as described in FIGS. 1-12. The example of FIG. 13 is drawn substantially to scale, even though each and every point is not labeled with numerical values. As such, relative differences in timings can be estimated by the drawing dimensions. However, other relative timings may be used, if desired.

Continuing with FIG. 13, illustrating an engine position along the x axis in crank angle degrees (CAD). Curve 1302 depicts piston positions (along the y axis), with reference to their location from top dead center (TDC) and/or bottom dead center (BDC), and further with reference to their location within the four strokes (intake, compression, power and exhaust) of an engine cycle.

Curve 1304 depicts intake valve timing, lift, and duration for an intake valve (along the y axis). As illustrated, the intake valve is opened during the intake stroke of the piston. However, it will be appreciated that the intake valve may be operated with a different timing by adjusting the phasing, lift, and/or duration based on engine conditions, in other examples. L depicts the valve lift amount and D depicts the valve opening duration.

Curve 1306 depicts fuel injection pressure from a fuel injector (e.g., port or direct fuel injector) (along the y axis).

ID indicates the injection duration during which fuel is injected through the fuel injector.

Curve 1308 depicts valve seat injection pressure from a valve seat injection orifice (along the y axis). VID indicates the injection duration during which fluid is injected through the intake valve seat injection orifice. Although, FIG. 13 depicts valve seat injection with regard to an intake valve seat, exhaust valve seat injection may additionally or alternatively may be employed, in other examples.

Plot 1310 indicates injection orifice valve control signal. Both an open and closed value are indicated on the y axis. It will also be appreciated that signals may also be provided that partially open or partially close the valve by varying degrees.

As shown in FIG. 13 the fuel injection via the fuel injectors and the fluid injection via the injection orifice in the intake valve seat are carried out during an intake stroke. Specifically, it will be appreciated that the injection orifice injection duration (VID) starts when the intake valve is opened and ends when the intake valve is closed. However, in other examples, the injection orifice valve may be used to retard and in some cases inhibit injection of fluid through the valve seat injection orifice during selected intake strokes. Additionally, the magnitude of injection orifice injection may be adjust by altering the output of the fluid pump in the valve seat fluid delivery assembly. In this way, fluid injection through a valve seat injection orifice can be controlled to increase combustion efficiency and reduce emissions, if desired.

It will be appreciated that the plots shown in FIG. 13 are exemplary in nature and that, in other examples, the timing of intake valve and therefore injection orifice fluid delivery may differ. For instance, variable valve lift (VVL) engines and Atkinson and miller cycle engine may have a different valve timing, such as early or late intake valve closing, may be used in other examples. Specifically, in one example, valve lift of an intake valve may be advanced or delayed by a VVT system to advance or delay injection of the fluid through the valve seat injection orifice.

The technical effect of injecting a fluid through an injection orifice in a valve seat is to increase the compactness of a fluid delivery assembly when compared to previous fluid delivery assemblies employing fluid injectors. Another technical effect of routing fluid through a valve seat injection orifice is to increase the reliability of the fluid injection assembly and to decrease cost of the assembly when compared to previous fluid delivery assemblies utilizing fluid injectors.

The invention will be further described in the following paragraphs. In one aspect, an engine system is provided that includes a valve coupled to a first cylinder and including a valve head; and a valve seat mating with the valve head when the valve is in a closed configuration; where the valve seat includes an injection orifice; where in a closed configuration the valve head obstructs fluid flow the injection orifice; and where in an open configuration fluid flow through the injection orifice is unobstructed by the valve head.

In another aspect, a method for controlling an engine system is provided that includes operating a valve to open and close the valve at selected time intervals to place the valve in an open configuration and a closed configuration; where in the closed configuration a valve head of the valve blocks a flow of a fluid from an injection orifice included in a valve seat into a cylinder; where the injection orifice in fluidic communication with a fluid reservoir storing the fluid; and where in the open configuration the valve head in the valve is spaced away from the injection orifice. In one example, the method may further includes operating a valve seat fluid delivery assembly to flow the fluid from the fluid reservoir to the injection orifice. In another example, the method may further include advancing or retarding an injection of the fluid through the injection orifice by adjusting valve lift timing of the valve. In another example, the method may further include adjusting an injection orifice valve to retard fluid injection from the injection orifice into the cylinder when the valve is in an open configuration and the valve head is spaced away from the valve seat responsive to a change in at least one engine operating condition and where the injection orifice valve is coupled to the injection orifice. The method may also include adjusting exhaust fluid injection metering through the injection orifice responsive to a conditional change in an emission control device in an exhaust system downstream of the valve.

In another aspect, an engine system is provided that includes a valve coupled to a first cylinder, including a valve head, and designed to open and close; a valve seat mating with the valve head; a valve seat fluid delivery assembly including: a fluid reservoir in fluidic communication with the injection orifice; a fluid pump designed to adjust a flowrate of a fluid flowing between the fluid reservoir and the injection orifice; and an injection orifice valve designed to regulate fluid flow between the fluid pump and the injection orifice; where closing the valve to mate the valve head in the valve seat blocks the injection orifice; and where opening the valve to move the valve head away from the valve seat unblocks the injection orifice.

In another aspect, an engine system may be provided that includes a valve coupled to a first cylinder and including a valve head; and a valve seat mating with the valve head when the valve is in a closed configuration; where the valve seat includes an injection orifice; where closing the valve to mate the valve head in the valve seat blocks the injection orifice; and where opening the valve to move the valve head away from the valve seat unblocks the injection orifice.

In any of the aspects or combinations of the aspects, the valve may be an intake valve and the injection orifice may be in fluidic communication with a fluid reservoir containing at least one of water, alcohol, and petroleum-based fuel.

In any of the aspects or combinations of the aspects, the valve may be an exhaust valve and the injection orifice may be in fluidic communication with a fluid reservoir storing at least one of an exhaust fluid and air.

In any of the aspects or combinations of the aspects, the engine system may further include a second cylinder and a second exhaust valve coupled to the second cylinder, where when the second exhaust valve in a closed configuration the second exhaust valve seats and seals on a continuous surface of a second valve seat that does not include any openings on the continuous surface.

In any of the aspects or combinations of the aspects, the engine system may further include a fluid reservoir in fluidic communication with the injection orifice; and a fluid pump designed to generate fluid flow between the fluid reservoir and the injection orifice.

In any of the aspects or combinations of the aspects, the engine system may further include a controller with computer readable instructions stored on non-transitory memory that when executed cause the controller to: adjust the fluid pump to alter fluid injection metering through the injection orifice in response to a change in one or more engine operating conditions.

In any of the aspects or combinations of the aspects, the engine system may further include an injection orifice valve designed to regulate fluid flow between the fluid pump and the injection orifice.

In any of the aspects or combinations of the aspects, the engine system may further include computer readable instructions stored on non-transitory memory that when executed cause the controller to: adjust the injection orifice valve to adjust fluid metering and/or timing through the injection orifice based on engine temperature.

In any of the aspects or combinations of the aspects, the engine system may further include computer readable instructions stored on non-transitory memory that when executed cause the controller to: adjust the injection orifice valve to retard fluid injection from the injection orifice into the cylinder when the valve is in an open configuration and the valve head is spaced away from the valve seat responsive to a change in at least one engine operating condition.

In any of the aspects or combinations of the aspects, the valve may be an exhaust valve and the fluid may include exhaust fluid or air or where the valve is an intake valve and the fluid includes one or more of water, alcohol, and petroleum-based fuel.

In any of the aspects or combinations of the aspects, the valve may be an exhaust valve and the fluid may be an exhaust fluid.

In any of the aspects or combinations of the aspects, the valve is an intake valve and where the fluid in the fluid reservoir includes at least one of water and alcohol.

In any of the aspects or combinations of the aspects, the valve may be an exhaust valve and the fluid may be air and where the engine system may further comprise: a controller with computer readable instructions stored on non-transitory memory that when executed cause the controller to: inject air through the injection orifice during an exhaust stroke of the cylinder; and execute an exhaust sensor diagnostic routine using a sensor reading from an exhaust gas sensor sampled subsequent to the injection of air through the injection orifice and during the exhaust stroke, where the exhaust gas sensor in an exhaust conduit downstream of the exhaust valve.

In any of the aspects or combinations of the aspects, the valve may be a first exhaust valve and where the fluid in the fluid reservoir includes at least one of an exhaust fluid and where the engine system may further comprise: a controller with computer readable instructions stored on non-transitory memory that when executed cause the controller to: adjust exhaust fluid injection metering through the injection orifice responsive to conditional changes in an emission control device in an exhaust system downstream of the valve.

In any of the aspects or combinations of the aspects, the engine system may further include a second cylinder includes a second exhaust valve with a second valve head seating and sealing on a second valve seat when the second exhaust valve is in a closed configuration, where the valve seat forms a continuous surface that does not include an injection orifice.

In any of the aspects or combinations of the aspects, the engine system may be included a hybrid vehicle including an electric motor providing motive power to one or more drive wheels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system comprising:
a fuel injector;
an intake valve coupled to a first cylinder and including a valve head; and
a valve seat mating with the valve head when the intake valve is in a closed configuration,
an injection orifice valve positioned to regulate fluid flow to an injection orifice,
the valve seat including the injection orifice,
where, in the closed configuration, the valve head obstructs a fluid flow of fuel, alcohol, or water through the injection orifice; and
where, in an open configuration, fluid flow through the injection orifice is unobstructed by the valve head, and
a controller with computer readable instructions stored on non-transitory memory that when executed cause the controller to:

adjust fluid flow through the injection orifice in the valve seat by adjusting a combination of the injection orifice valve and a time that the valve head is in the open configuration based on one or more engine conditions.

2. The engine system of claim 1, further comprising a fluid pump providing fluid flow to the injection orifice; and instructions that when executed cause the controller to:
adjust the fluid pump to alter fluid injection metering through the injection orifice in response to a change in a valve seat temperature.

3. The engine system of claim 1, further comprising instructions that when executed cause the controller to:
adjust the injection orifice valve to adjust fluid metering and/or timing through the injection orifice when the valve head is in the open configuration based on engine temperature.

4. The engine system of claim 3, further comprising instructions that when executed cause the controller to:
adjust the injection orifice valve to retard fuel injection from the injection orifice into the first cylinder when the intake valve is in an open configuration and the valve head is spaced away from the valve seat responsive to a change in at least one engine operating condition.

5. The engine system of claim 1, wherein the time that the valve head is in the open configuration is adjusted to advance or retard fuel injection into the first cylinder.

6. The engine system of claim 1, wherein valve lift timing is adjusted to adjust fluid flow through the injection orifice.

7. The engine system of claim 1, further comprising instructions for adjusting the injection orifice valve in response to a valve seat temperature.

8. A method for controlling an engine system, comprising:
injecting fuel via a fuel injector;
operating a valve to open and close the valve at selected time intervals to place the valve in an open configuration and a closed configuration;
where, in the closed configuration, a valve head of the valve blocks a flow of a fluid from an injection orifice included in a valve seat into a cylinder;
where, the injection orifice, in fluidic-communication with a fluid reservoir, stores the fluid;
where, in the open configuration, the valve head in the valve is spaced away from the injection orifice;
operating an injection orifice valve to control fluid flow to the injection orifice; and
adjusting a timing of the operation of the injection orifice valve relative to when the valve head is in the open configuration.

9. The method of claim 8, further comprising advancing or retarding an injection of the fluid through the injection orifice by adjusting valve lift timing of the valve.

10. The method of claim 8, further comprising adjusting the injection orifice valve to retard fluid injection from the injection orifice into the cylinder when the valve is in the open configuration and the valve head is spaced away from the valve seat responsive to a change in at least one engine operating condition and where the injection orifice valve is coupled to the injection orifice.

11. The method of claim 8, where the valve is an exhaust valve and the fluid is an exhaust fluid and where the method further comprises adjusting exhaust fluid injection metering through the injection orifice responsive to conditional changes in an emission control device in an exhaust system downstream of the valve.

12. The method for controlling the engine system of claim 8, further comprising:
adjusting the timing of operation of the injection orifice valve relative to a time the valve head is in the open configuration to advance or retard fuel injection.

13. The method for controlling the engine system of claim 8, further comprising injecting fuel through the injection orifice included in the valve seat in response to cold start conditions.

14. The method for controlling the engine system of claim 8, further comprising beginning injection of fuel through the injection orifice included in the valve seat prior to a fuel injection through a port or direct fuel injector.

15. An engine system comprising:
a fuel injector;
a valve coupled to a first cylinder, including a valve head, and designed to open and close;
a valve seat mating with the valve head and the valve seat comprising an injection orifice;
a valve seat fluid delivery assembly including:
a fluid reservoir in fluidic communication with the injection orifice;
a fluid pump designed to adjust a flowrate of a fluid flowing between the fluid reservoir and the injection orifice; and
an injection orifice valve designed to regulate fluid flow between the fluid pump and the injection orifice;
where closing the valve to mate the valve head in the valve seat blocks the injection orifice; and
where opening the valve to move the valve head away from the valve seat unblocks the injection orifice,
a controller with computer readable instructions stored on non-transitory memory that when executed cause the controller to adjust fluid flow through the injection orifice in the valve seat by adjusting the injection orifice valve and the opening of the valve.

16. The engine system of claim 15, where the valve is an exhaust valve and where the fluid is air and further comprising instructions that when executed cause the controller to:
inject air through the injection orifice during an exhaust stroke of the cylinder; and
execute an exhaust sensor diagnostic routine comparing a sensor reading from an exhaust gas sensor sampled subsequent to the injection of air through the injection orifice and during the exhaust stroke to an expected value based on the injection of air, where the exhaust gas sensor is in an exhaust conduit downstream of the exhaust valve.

17. The engine system of claim 15, where the valve is a first exhaust valve and where the fluid in the fluid reservoir includes at least one of an exhaust fluid and further comprising instructions that when executed cause the controller to:
adjust exhaust fluid injection metering through the injection orifice responsive to a conditional change in an emission control device in an exhaust system downstream of the valve.

18. The engine system of claim 15, further comprising determining if a change in a temperature of the valve seat has exceeded a temperature threshold and adjusting a fluid pressure to the injection orifice based on the determination of the change exceeding the temperature threshold.

19. The engine system of claim 18, wherein the fluid pressure is decreased in response to an increase in the temperature of the valve seat.

20. The engine system of claim 18, wherein the fluid pressure is increased to cool the valve seat in response to an increase in the temperature of the valve.

* * * * *